(12) United States Patent
Mastromatto et al.

(10) Patent No.: US 8,091,937 B2
(45) Date of Patent: Jan. 10, 2012

(54) SLIDING TARPAULIN FOR HAULING MATERIAL

(75) Inventors: Robert Mastromatto, Ambler, PA (US); Frank Cerminara, Jr., Chalfont, PA (US)

(73) Assignee: MC Inventors, Inc., Ambler, PA (US)

( * ) Notice: Subject to any disclaimer, the term of this patent is extended or adjusted under 35 U.S.C. 154(b) by 1177 days.

(21) Appl. No.: 11/894,504

(22) Filed: Aug. 20, 2007

(65) Prior Publication Data
US 2007/0290464 A1 Dec. 20, 2007

Related U.S. Application Data

(63) Continuation-in-part of application No. 10/719,245, filed on Nov. 21, 2003, now abandoned.

(51) Int. Cl.
*A45F 5/00* (2006.01)
*B65B 15/00* (2006.01)

(52) U.S. Cl. .......................... 294/152; 294/149
(58) Field of Classification Search ............... 294/1.1, 294/140, 142, 149, 152; 280/18, 19; 383/4, 383/34; D8/1; D12/11; 5/625, 627, 628
See application file for complete search history.

(56) References Cited

U.S. PATENT DOCUMENTS

| | | | |
|---|---|---|---|
| 2,627,422 A | 2/1953 | Pagelkopf | |
| 2,635,452 A * | 4/1953 | Harris, Sr. | 294/49 |
| 2,974,971 A * | 3/1961 | Buck | 280/19 |
| D191,832 S | 11/1961 | Greenberg | |
| 3,024,824 A * | 3/1962 | Bass | 294/149 |
| 3,222,080 A * | 12/1965 | Kinraide | 280/18 |
| 3,319,972 A | 5/1967 | Gallagher | |
| 3,355,187 A | 11/1967 | Brindle | |
| D216,530 S | 2/1970 | Ziff | |
| 3,666,282 A | 5/1972 | Buening et al. | |
| 3,734,523 A | 5/1973 | Field | |
| 3,771,808 A * | 11/1973 | Duerst | 280/19 |
| 3,884,490 A | 5/1975 | Hellman | |
| 4,046,393 A | 9/1977 | Vadnais | |
| 4,170,367 A | 10/1979 | Rickenbacher et al. | |
| 4,173,351 A | 11/1979 | Hetland | |
| 4,382,068 A * | 5/1983 | Rokukawa | 423/53 |
| 4,627,428 A * | 12/1986 | Brooks | 128/873 |
| D296,311 S | 6/1988 | Dunmon, Jr. | |
| 5,104,133 A | 4/1992 | Reiner | |
| 5,211,434 A | 5/1993 | Lanava | |
| 5,255,765 A | 10/1993 | Schrecongost | |
| 5,529,321 A * | 6/1996 | Thompson | 280/19 |
| D374,846 S | 10/1996 | Dickhaut et al. | |
| 5,660,402 A | 8/1997 | Jones et al. | |
| 5,836,593 A | 11/1998 | Skinner | |
| 5,943,831 A | 8/1999 | Pangburn | |
| 5,978,989 A * | 11/1999 | Chavez | 294/140 |
| 6,565,101 B2 | 5/2003 | Jones et al. | |
| D475,947 S | 6/2003 | Eckert | |
| D476,267 S | 6/2003 | Eckert | |
| 6,746,028 B2 | 6/2004 | Barbee | |
| 7,726,710 B2 * | 6/2010 | Handwerker | 294/1.1 |
| 2004/0026881 A1 * | 2/2004 | Touchette | 280/18 |
| 2005/0263998 A1 | 12/2005 | Edwards | |

* cited by examiner

*Primary Examiner* — Paul T Chin

(74) *Attorney, Agent, or Firm* — Howson & Howson, LLP

(57) ABSTRACT

A sliding tarp for hauling landscaping materials and debris is composed of a flexible, foldable rectangular sheet having attached to its underside a widthwise row of three elongated, relatively rigid convex glides disposed rearward of a location midway between the front and rear edges of the sheet, and arranged so that the tarp can be folded along longitudinal fold lines extending between adjacent glides.

11 Claims, 4 Drawing Sheets

SLIDING TARPAULIN FOR HAULING MATERIAL

CROSS-REFERENCE TO RELATED APPLICATION

This application is a continuation-in-part of application Ser. No. 10/719,245, filed Nov. 21, 2003. The entire disclosure of application Ser. No. 10/719,245 is incorporated by reference herein.

FIELD OF THE INVENTION

This invention relates to tarpaulins, and more particularly to a tarpaulin for use in hauling materials such as leaves, landscaping debris, landscaping materials such as mulch, and the like.

BACKGROUND OF THE INVENTION

Tarpaulins, also known as "tarps," are primarily used as protective covers for piles of material or stacks of objects. However, they are also commonly used to haul materials across the ground. For example, after raking or blowing leaves, landscapers frequently use tarps, to collect the leaves and transport them for disposal. Tarps can also be used to transport other landscaping debris such as sticks and other plant matter, as well as soil, mulch and various other materials. A large tarp, e.g., a 3.5×2.5 meter rectangular tarp, can be used to haul a quantity of material equivalent to as many as five to ten wheelbarrow loads.

Tarps are manufactured from a wide variety of materials. A tarp used for hauling is typically composed of a nylon mesh having a coating of polyethylene or other suitable polymer. Typical landscaping tarps are described in the following U.S. Pat. No. 2,974,971, granted to H. H. Buck on Mar. 14, 1961; U.S. Pat. No. 3,355,187, granted to M. Brindle on Nov. 28, 1967; U.S. Pat. No. 5,104,133, granted to D. Reiner on Apr. 14, 1992; U.S. Pat. No. 5,529,321, granted to G. Thompson on Jun. 25, 1996; U.S. Pat. No. 5,660,402, granted to E. Jones et al. on Aug. 26, 1997; U.S. Pat. No. 5,943,831, granted to W. Pangburn on Aug. 31, 1999; and U.S. Pat. No. 6,565,101, granted to B. Jones et al. on May 20, 2003.

When a tarp is used to haul materials such as landscaping debris, it is dragged along the ground, and friction and abrasion between the tarp and the surface on which it is dragged can cause rapid deterioration of the tarp. Depending on the material from which it is made, and the manner in which it is used, the tarp can reach the point at which it is no longer useful in a few weeks, or even a few days.

One solution to the problem of deterioration by abrasion is to use a sled-like device instead of a tarp. One such device is described in U.S. Pat. No. 4,173,351, granted to Philip R. Hetland on Nov. 6, 1979. Another such device is described in U.S. Pat. No. 5,211,434, granted to Santo M. Lanava on May 18, 1993. Still another sled-like device is described in U.S. patent application publication 2005/0264998, published on Dec. 1, 2005. A difficulty with such a sled-like device is that, if it is large enough to hold several wheelbarrow loads of material, it cannot be stored easily, and cannot be transported easily on a landscaper's vehicle.

BRIEF SUMMARY OF THE INVENTION

This invention addresses the problems of abrasion and storage encountered in previously proposed hauling devices designed to be dragged along the ground.

In general, the invention is a hauling tarpaulin comprising a flexible sheet, and provided with low-friction glides that protect the flexible sheet from damage. The glides are arranged in such a way that the tarp can be made to slide easily on the ground and so that it can be folded into a compact configuration when not in use.

More particularly, the tarp comprises a flexible, foldable, sheet having opposite front and back edges spaced from each other in a lengthwise direction, opposite side edges spaced from each other in a widthwise direction, a top face and a bottom face. The tarp is provided with a plurality of substantially rigid synthetic resin glides, each having a top side and a bottom side. The top sides of the glides are attached to the bottom face of the sheet, and the bottom sides of the glides are sufficiently smooth to enhance sliding of the sheet on a supporting surface. The glides are spaced from one another in an array such that the sheet can be folded on itself along fold lines extending between adjacent glides from one edge of the sheet to an opposite edge of the sheet.

The glides, and preferably all of the glides attached to the tarpaulin, are located nearer to the back edge than to the front edge of the flexible, foldable, sheet. Preferably, all the glides are located rearward of a location midway between the front and back edges of the flexible, foldable sheet, so that the tarpaulin can be folded longitudinally along uninterrupted areas extending between glides in the lengthwise direction from the front edge to the back edge of the sheet, and then along a fold line extending widthwise across the longitudinally folded tarp, preferably midway between the front and back edges.

In a preferred embodiment, a reinforcing sheet is secured to the flexible, foldable, sheet. The reinforcing sheet is also flexible, and overlaps substantially the entire area occupied by the glides.

A set of hand grips is preferably attached to the flexible, foldable, sheet and located adjacent the front edge. Each of the hand grips can be formed by a loop of reinforcing strap material unitary with two lengths of strap material sewn to the flexible, foldable, sheet, each length extending from one of the glides to the front edge of the sheet.

A major part of the bottom side of each of the glides is preferably convex, and each of glides is preferably elongated in the lengthwise direction of the tarp. The central portion of each glide is preferably surrounded by a rim which is unitary with the central portion, and the rim is secured to the flexible, foldable sheet by a plurality of rivets.

The tarp according to the invention exhibits high durability. It can be used to transport heavy and/or bulky loads with minimal effort, and can be readily folded into a compact size for storage when not in use.

Other objects, details and advantages of the invention will be apparent from the following detailed description when read in conjunction with the drawings.

DETAILED DESCRIPTION OF THE PREFERRED EMBODIMENT

Figure 1:
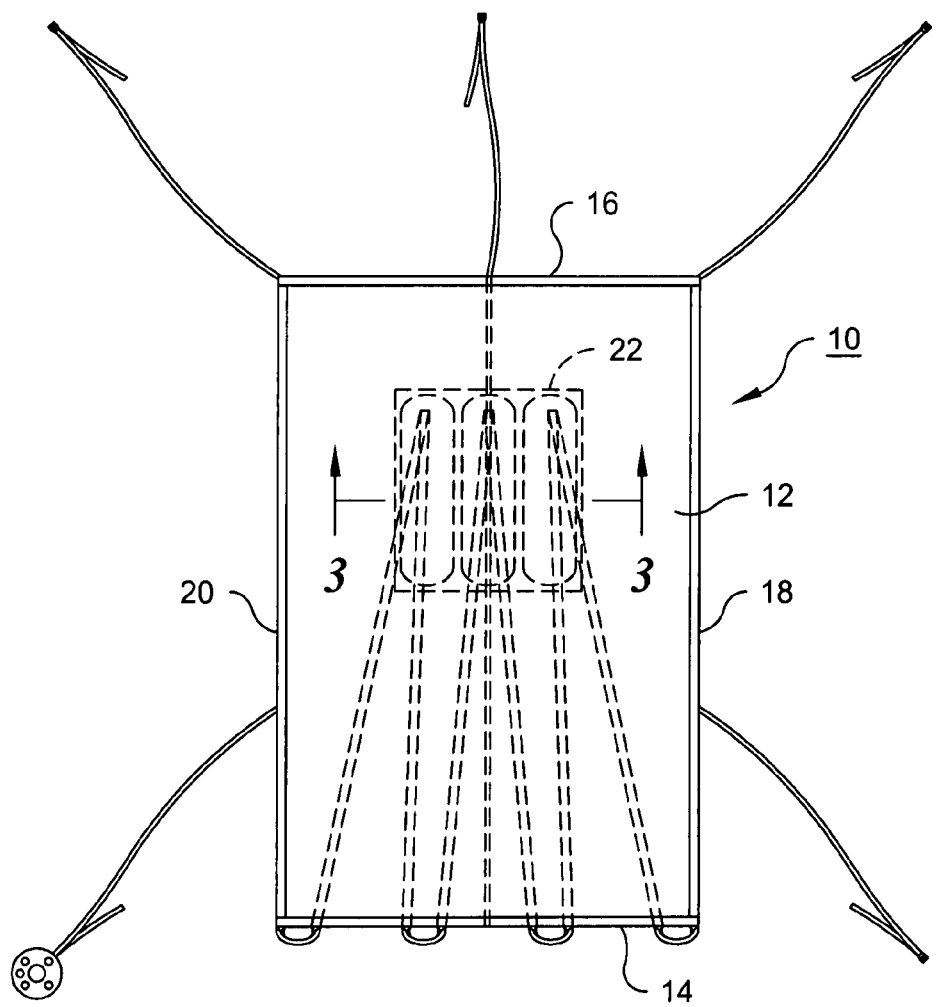
FIG. 1 is a top plan view of a tarpaulin according to the invention.
Figure 2:
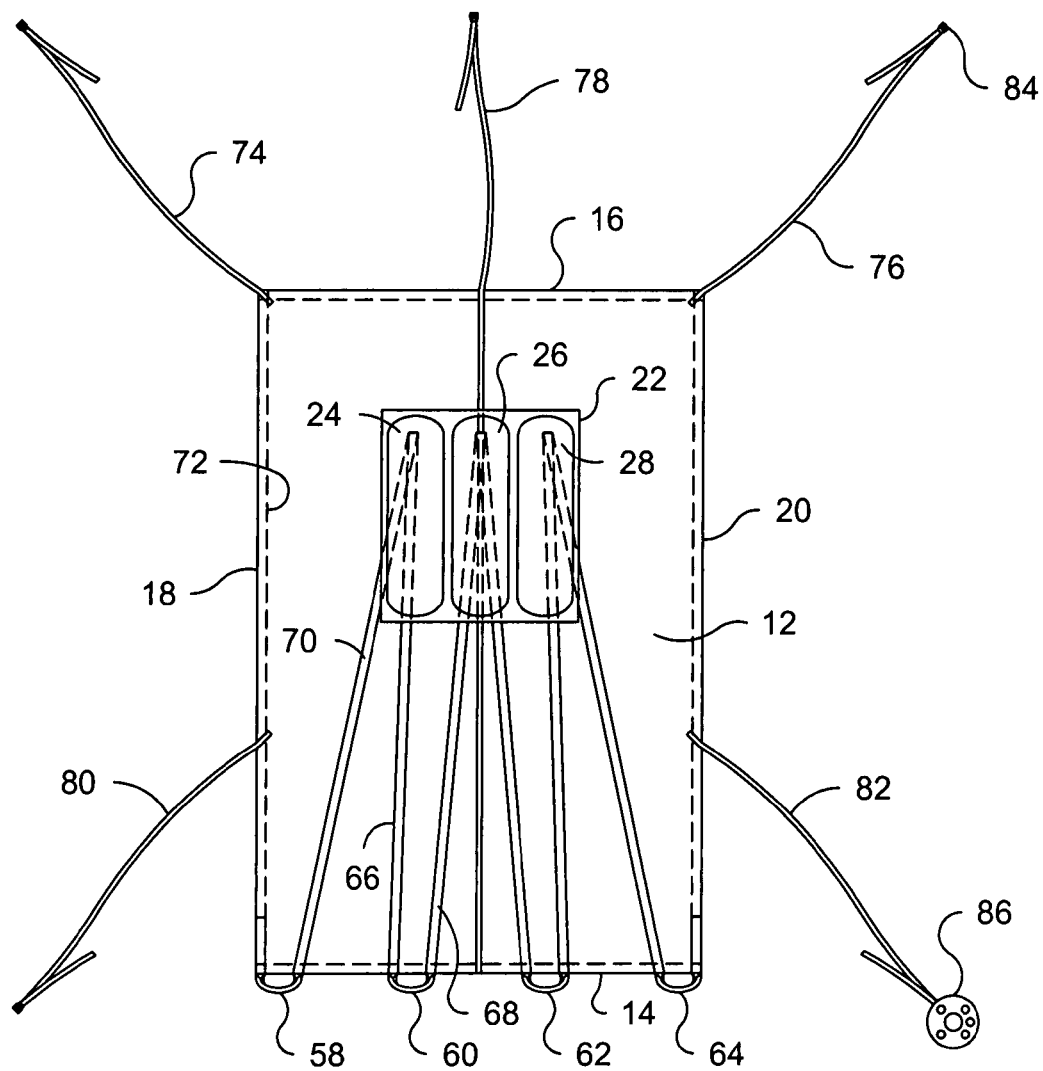
FIG. 2 is a bottom plan view thereof.

As shown in FIGS. 1 and 2, the preferred tarp 10 according to the invention comprises a flexible, foldable rectangular sheet 12 of polyethylene-coated nylon mesh. The sheet is similar to a conventional hauling tarp, and has a front edge 14, a back edge 16, and side edges 18 and 20. The sneet can be provided in a wide range of sizes. A practical size for general landscaping applications is 2.5×3.5 meters, the front and back edges being 2.5 meters in length and the side edges being 3.5 meters in length.

A rectangular reinforcing sheet 22, which is also flexible and foldable, is sewn or adhesively attached to sheet 12 and positioned so that it overlaps an area nearer to the back edge 16 than to the front edge 14. Preferably, the reinforcing sheet 22 is entirely rearward of a location midway between the front and back edges of sheet 12.

Figure 3:
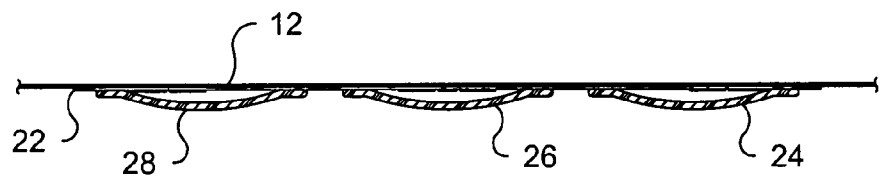
FIG. 3 is a sectional view of a portion of the tarpaulin taken on section plane 3-3 in FIG. 1
Figure 6:
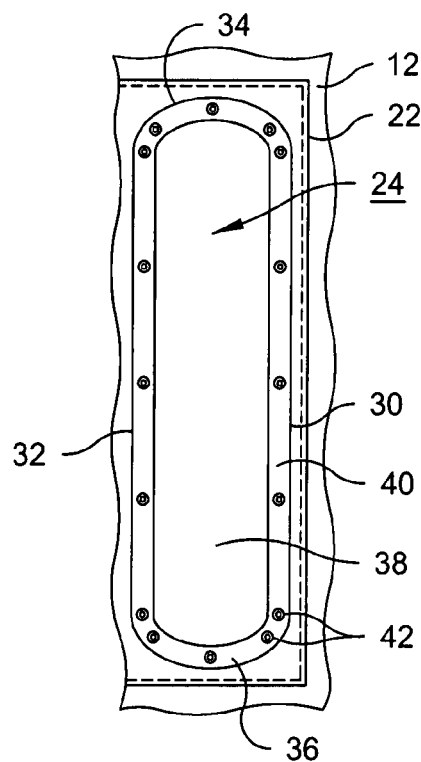
FIG. 6 is a fragmentary bottom plan view showing the manner in which a slide is attached to the flexible sheet.

In the embodiment illustrated, three glides, 24, 26 and 28, are secured to the reinforcing sheet and aligned with one another in a widthwise row. The glides are elongated along the length of the long dimension of the sheet 12, and, as shown in FIG. 3, they are shaped so that their bottoms comprise convex portions surrounded by rims which are secured to the reinforcing sheet 22 and to the sheet 12 by rivets (not shown in FIGS. 1 and 2). As shown in FIG. 6, glide 24 is elongated longitudinally, and is shaped so that it has straight side edges 30 and 32 and rounded ends 34 and 36. The convex part 38 is surrounded by a rim 40 that is secured by rivets, e.g. rivets 42, to sheets 22 and 12.

The glides are preferably formed from a polymer, such as poly (vinyl chloride) (PVC), that exhibits low coefficients of friction when in contact with, and sliding over, a typical outdoor surface such as grass, dirt, paving, etc. Preferably, the glides are molded, and have a thickness of about 0.9 cm. The glides are substantially rigid, and although they can be bent to some extent by the application of a sufficient force, unlike the sheet 12 and the reinforcing sheet 22, they cannot be folded and unfolded.

As seen in FIGS. 1 and 2, the glides are positioned nearer to the back edge 16 of the tarp than to the front edge 14, and preferably rearward of a location midway between the front and back edges. When the tarp is being pulled manually at the front edge 14, the front edge is raised, and the load being hauled tends to settle toward the rear of the tarp. Therefore, when the glides are positioned toward the back edge, they will be directly, or almost directly, underneath center of gravity of the load. When the glides are rearward of a location midway between the front and back edges, the tarp can also be readily folded into a compact configuration for storage.

Figure 4:
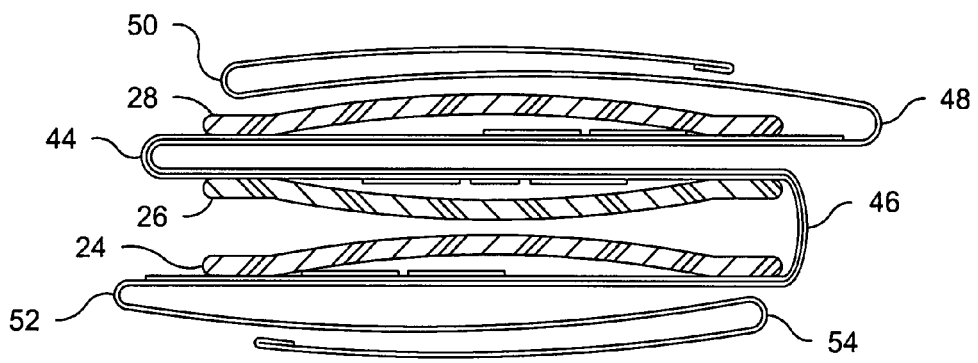
FIG. 4 is a schematic sectional view showing the tarpaulin folded along fold lines extending in parallel to the longer dimension of the tarpaulin.
Figure 5:
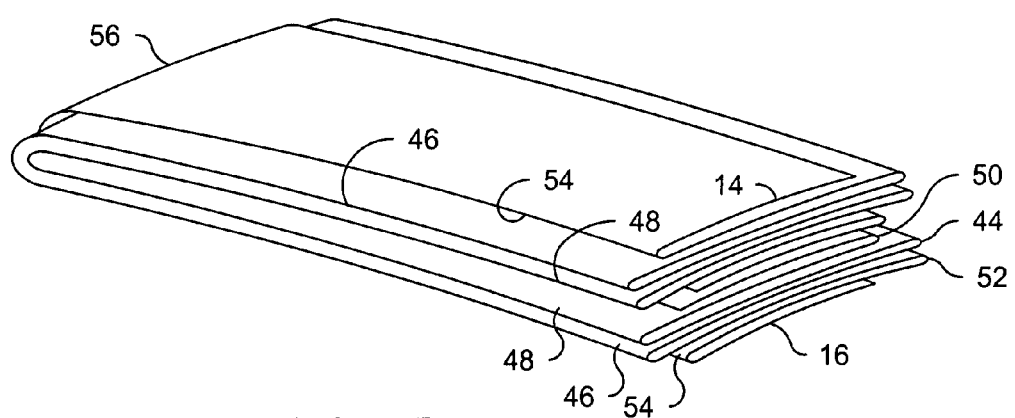
FIG. 5 is a schematic perspective view showing the tarpaulin folded as in FIG. 4 and also folded along a fold line extending parallel to the shorter dimension of the tarpaulin.

The manner in which the tarp can be folded is illustrated in FIGS. 4 and 5. As shown in FIG. 4, the tarp can be folded along fold lines 44 and 46 that extend longitudinally between glides 28 and 26, and between glides 26 and 24, respectively. The tarp can also be folded along additional fold lines at 48, 50, 52 and 54. After the six longitudinal folds are made as shown in FIG. 4, the tarp can be folded along a transverse fold line 56, as shown in FIG. 5, at a location midway between the back edge and the front edge 14. In this way, the tarp can be folded into a compact configuration for transport or storage.

As best shown in FIG. 2, the front edge 14 of the tarp is provided with a set of hand grips 58, 60, 62 and 64, which consist of loops of woven fabric that are continuous with woven fabric reinforcing straps sewn to the tarp and extending to the locations of the glides. For example, grip 60 is a fabric loop that is continuous with lengths 66 and 68 of fabric that extend to glides 24 and 26, respectively. Grip 58, is continuous with length 70 of fabric that extends to the location of glide 24, and the outer end of the loop is sewn to side edge 18 of the sheet 12. The side edges as well as the front and back edges of the sheet 12 are preferably folded and sewn, e.g. by stitches 72, and an edge reinforcement, such as a rope (not shown), can be provided within the channel formed by the folded edge. Although the reinforcing straps are stitched to the sheet 12, it is desirable to provide additional stitching for reinforcement at the locations at which the hand grips meet the front edge of the tarp.

Figure 7:
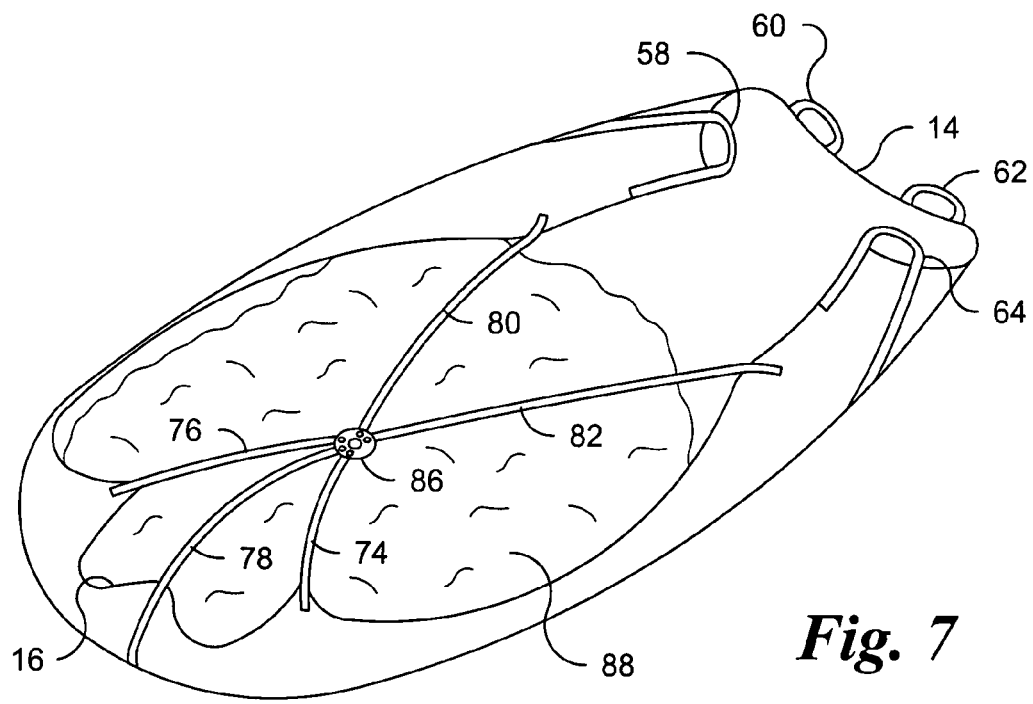
FIG. 7 is a perspective view showing the tarpaulin in use.

Also shown in FIG. 2 are tie-down straps 74 and 76, secured to corners of the tarp at the back edge 16, tie-down strap 78, secured to the center of the back edge and extending to the front edge 16, and tie-down straps 80 and 82, secured respectively to the side edges 18 and 20 at locations slightly forward of the midpoint between the front and back edges. Each tie-down strap is provided with a conventional pinch clip, e.g., clip 84 on strap 76, and the clip is slidably adjustable on the strap, so that the length of strap between the tarp and the clip can be adjusted. A circular connector 86 is shown connected to the clip on strap 82. The connector can be connected to all five straps, as shown in FIG. 7. The tie-down straps can be tightened so that the tarp is wrapped partly around a load 88, which can be transported by manually pulling on two or more of the hand grips and dragging the tarp along the ground. As mentioned previously, the glides are positioned so that they are approximately under the center of gravity of the load, which will be rearward of the location midway between the front and back edges of the tarp. The elongation of the glides along the direction from the front edge to the back edge of the tarp enables the tarp to slide smoothly along the ground even when heavily loaded. The glides, in turn, protect the tarp fabric from damage, thereby extending its useful life.

Various modifications can be made to the tarp described. For example, the number of glides in the widthwise row can be increased, and plural widthwise rows of glides can be provided. Preferably, however, the glides should be arranged so that there are uninterrupted areas of fabric, i.e., areas uninterrupted by a glide, extending from one edge to the opposite edge of the tarp. The tarp material is preferably polyethylene-coated nylon, having a weight of 6.5 oz. per square yard, with a 1200 denier nylon mesh and a 14×14 mesh count. The tarp size is preferably about 3.5 meters in length and about 2.5 meters in width. However, any of various tarp materials can be used, and the size of the tarp can be varied. The tarp need not be exactly rectangular, and various alternative shapes can be adopted.

The glides are preferably about 1 meter in length and about 30 cm in width, with a thickness of 0.9 cm. However, the sizes and shapes of the glides can be varied as well.

Still other modifications may be made to the apparatus and method described above without departing from the scope of the invention as defined in the following claims.

The invention claimed is:

1. A sliding tarpaulin for hauling material comprising:
   a flexible, foldable, sheet having opposite front and back edges spaced from each other in a lengthwise direction, opposite side edges spaced from each other in a widthwise direction, a top face and a bottom face; and
   a plurality of substantially rigid synthetic resin glides each having a top side and a bottom side, the top sides of the glides being attached to the bottom face of the sheet, and the bottom sides of the glides being sufficiently smooth to enhance sliding of the sheet on a supporting surface;

the glides being spaced from one another in an array such that the sheet can be folded on itself along fold lines extending between adjacent glides from one edge of the sheet to an opposite edge of the sheet, in which a central portion of the bottom side of each of said glides is convex, in which said central portion is surrounded by a rim which is unitary with the central portion, and in which the rim is in facing relationship with a part of the flexible, foldable sheet, and secured against movement relative to the part of the flexible, foldable sheet with which it is in facing relationship.

2. A sliding tarpaulin according to claim 1, in which each of said glides is elongated in said lengthwise direction.

3. A sliding tarpaulin according to claim 2, in which a major part of the bottom side of each of said glides is convex.

4. A sliding tarpaulin according to claim 1, in which all of the glides of the tarpaulin are located nearer to the back edge than to the front edge of the flexible, foldable, sheet.

5. A sliding tarpaulin according to claim 1, in which the glides are arranged in at least one row extending in said widthwise direction, in which uninterrupted areas of the flexible, foldable, sheet extend, between the glides of each pair of adjacent glides in each said row, in the lengthwise direction from said front edge to said back edge, and in which all the glides of the tarpaulin are located rearward of a location midway between said front and back edges of the flexible, foldable sheet, whereby the tarpaulin can be folded longitudinally along said uninterrupted areas, and then along a fold line extending widthwise across the longitudinally folded tarpaulin.

6. A sliding tarpaulin according to claim 1, in which the glides are arranged in at least one row extending in said widthwise direction, in which uninterrupted areas of the flexible, foldable, sheet extend, between the glides of each pair of adjacent glides in each said row, in the lengthwise direction from said front edge to said back edge, and in which all the glides of the tarpaulin are located rearward of a location midway between said front and back edges of the flexible, foldable sheet, whereby the tarpaulin can be folded longitudinally along said uninterrupted areas, and then along a fold line extending widthwise across the longitudinally folded tarpaulin at said location midway between said front and back edges.

7. A sliding tarpaulin according to claim 1, in which each rim is secured to the part of the flexible, foldable sheet with which it is in facing relationship by a plurality of rivets.

8. A sliding tarpaulin for hauling material comprising:

a flexible, foldable, sheet having opposite front and back edges spaced from each other in a lengthwise direction, opposite side edges spaced from each other in a widthwise direction, a top face and a bottom face; and at least one substantially rigid synthetic resin glide, each said glide having a top side and a bottom side, the top side of each said glide being attached to the bottom face of the sheet, and the bottom side of each said glide being sufficiently smooth to enhance sliding of the sheet on a supporting surface;

in which a central portion of the bottom side of each said glide is convex, in which said central portion is surrounded by a rim which is unitary with the central portion, and in which the rim is in facing relationship with a part of the flexible, foldable sheet, and secured against movement relative to the part of the flexible, foldable sheet with which it is in facing relationship.

9. A sliding tarpaulin according to claim 8, in which each said glide is elongated in said lengthwise direction.

10. A sliding tarpaulin according to claim 8, in which a major part of the bottom side of each said glide is convex.

11. A sliding tarpaulin according to claim 8, in which each rim is secured to the part of the flexible, foldable sheet with which it is in facing relationship by a plurality of rivets.

* * * * *